US006031363A

United States Patent [19]

Danstrom et al.

[11] Patent Number: 6,031,363

[45] **Date of Patent: *Feb. 29, 2000**

[54] VOLTAGE REGULATOR CIRCUIT

[75] Inventors: Eric J. Danstrom; Mitchell A. Belser, both of Farmington Hills; William E. Edwards, Milford, all of Mich.

[73] Assignee: STMicroelectronics, Inc., Carrollton, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/921,864

[22] Filed: Aug. 22, 1997

Related U.S. Application Data

[63] Continuation of application No. 08/521,344, Aug. 30, 1995, abandoned.

[51] Int. Cl.[7] ................................ G05F 5/00; H02P 9/30

[52] U.S. Cl. .......................... 323/273; 323/307; 323/274; 307/10

[58] Field of Search .................................... 323/274, 275, 323/276, 213, 214, 273; 320/104; 307/10.1

[56] References Cited

U.S. PATENT DOCUMENTS

| | | | |
|---|---|---|---|
| 4,323,837 | 4/1982 | Nakamura et al. | 307/10 R |
| 4,628,247 | 12/1986 | Rossetti | 323/314 |
| 4,680,483 | 7/1987 | Giordano | 307/355 |
| 4,694,238 | 9/1987 | Norton | 320/61 |
| 4,792,747 | 12/1988 | Schroeder | 323/274 |
| 5,079,497 | 1/1992 | Barbu et al. | 323/274 |
| 5,166,538 | 11/1992 | Norton | 322/28 |
| 5,298,851 | 3/1994 | DeNardis | 322/28 |
| 5,367,249 | 11/1994 | Honnigford | 323/313 |
| 5,373,226 | 12/1994 | Kimura | 323/313 |
| 5,449,999 | 9/1995 | Edwards | 322/28 |
| 5,487,956 | 1/1996 | Bromley et al. | 320/2 |
| 5,541,456 | 7/1996 | Maggioni et al. | 320/61 |

*Primary Examiner*—Peter S. Wong
*Assistant Examiner*—Rajnikant B. Patel
*Attorney, Agent, or Firm*—Theodore E. Galanthay; Lisa K. Jorgenson; Renee M. Larson

[57] ABSTRACT

A voltage regulator which has two regulation circuits and a comparator for controlling the two regulation circuits is disclosed. The input of the comparator is connected to a power supply voltage such that the output of the comparator changes states when the power supply voltage reaches a predetermined voltage of around 8 volts. The first regulation circuit is enabled to provide the Vcc from the battery voltage until the power supply voltage reaches around 8 volts which is when the comparator changes states. At that point, the first regulation is disabled and the second regulation circuit is enabled to provide the Vcc voltage from the power supply voltage. Since the power supply voltage never reaches the load dump high voltages, the second pass transistors never gets exposed to a high voltage condition. Also, the first transistor can withstand higher voltages since its base is grounded.

21 Claims, 3 Drawing Sheets

VOLTAGE REGULATOR CIRCUIT

This is a continuation, of application Ser. No. 08/521,344 filed Aug. 30, 1995 now abandoned.

BACKGROUND OF THE INVENTION

1. Field of the Invention

This invention relates to electronic circuits used to regulate a voltage, and, more specifically, to electronic circuits used to regulate Vcc voltages in an automobile.

2. Description of the Relevant Art

The problem addressed by this invention is encountered in the automobile industry. It is common in the automobile industry for the automobile to have a battery which is used to provide electrical power to the automobile when the engine is not running. The battery also provides the power necessary to start the motor of the automobile. Once the motor is started, either an alternator or a generator provides the electrical voltage necessary to recharge the battery. However, when a vehicle's battery cable is disconnected from its battery when the engine is running, the voltage on the battery cable can become excessive and potentially damage any device connected to it. This condition is referred to as "load dump". During a load dump condition, the voltage on the batteries cable may reach 60 or more volts. Therefore, it is desirable to have all circuits which are connected to the battery circuit to be able to withstand a high voltage load dump condition.

Additionally, market pressures and government constraints are motivating automobile manufacturers to increase the fuel efficiency while decreasing the emissions of automobiles. The market forces are also requiring that automobiles continue to improve their reliability and decrease their costs. The increasing use of electronics for ignition control systems and the like to accomplish these goals is well known in the industry. It will be appreciated by persons skilled in the art that the increase of electronics requires an increase in the use of voltage regulation and pre-regulation circuits to provide a steady and constant voltage to the electronics on an automobile.

Referring now to FIG. 1, a voltage regulator as known in the prior art will now be described. In this circuit, a regulated Vcc voltage is produced from an unregulated battery voltage Vbatt. In general, the circuit can be thought of as having a current bias circuit, a pass element, and a regulation circuit.

The current bias circuit is made from resistors 2, 8, and 16, diodes 4 and 6, transistors 10, 12 and 14. Their operation can be summarized as generating a bias current at the base of transistor 38 which is used by the voltage regulation circuit.

NPN bipolar transistor 46 is the pass element of the voltage regulator. It is understood in the art that the pass element controls the output current of the voltage regulator as a function of the regulation circuit such that a constant output voltage is maintained.

The regulation circuit consists of a band gap circuit and a voltage step up circuit. The bandgap circuit includes resistors 18, 24, 26, and 28, and transistors 20, 22, 30, and 32. In the band gap configuration, a thermally stable voltage is generated at the base of transistors 22 and 32, as is known in the art. The regulation circuit also includes the voltage divider circuit created with resistors 48 and 50. The scaled voltage from the voltage divider is fed back to the bandgap circuit to increase or decrease the current output of pass transistor 46 in response to the output voltage decreasing or increasing, respectively, as is known in the art.

In an automobile application, the Vbatt voltage is typically 12 volts and the Vcc voltage is typically around 5 volts. However, Vbatt can rise to over 60 volts under the load dump conditions described above. The typical prior art solution to handle the load dump condition was to use a pass transistor which can handle high voltage conditions. However, this prior art solution restricts the integration process technology to a high voltage process.

Therefore, it is an object of the invention to have a voltage regulator which can handle a load dump condition but which can be made using a low voltage process. These and other objects, features, and advantages of the invention will be apparent to those skilled in the art from the following detailed description of the invention, when read with the drawings and appended claims.

SUMMARY OF THE INVENTION

The invention can be summarized as a voltage regulator which has two regulation circuits and a comparator for controlling the two regulation circuits. The input of the comparator is connected to a power supply voltage such that the output of the comparator changes states when the power supply voltage reaches a predetermined voltage of around 8 volts. The first regulation circuit is enabled to provide the Vcc from the battery voltage until the power supply voltage reaches around 8 volts which is when the comparator changes states. At that point, the first regulation is disabled and the second regulation circuit is enabled to provide the Vcc voltage from the power supply voltage. Since the power supply voltage never reaches the load dump high voltages, the second pass transistor never gets exposed to a high voltage condition. Also, the first transistor can withstand higher voltages since its base is grounded. Therefore, the regulation circuit claimed below can be made using a low voltage integration process technology.

DETAILED DESCRIPTION OF THE PREFERRED EMBODIMENT

A voltage regulator circuit constructed according to the preferred embodiment of the invention now will be described below.

Figure 1:
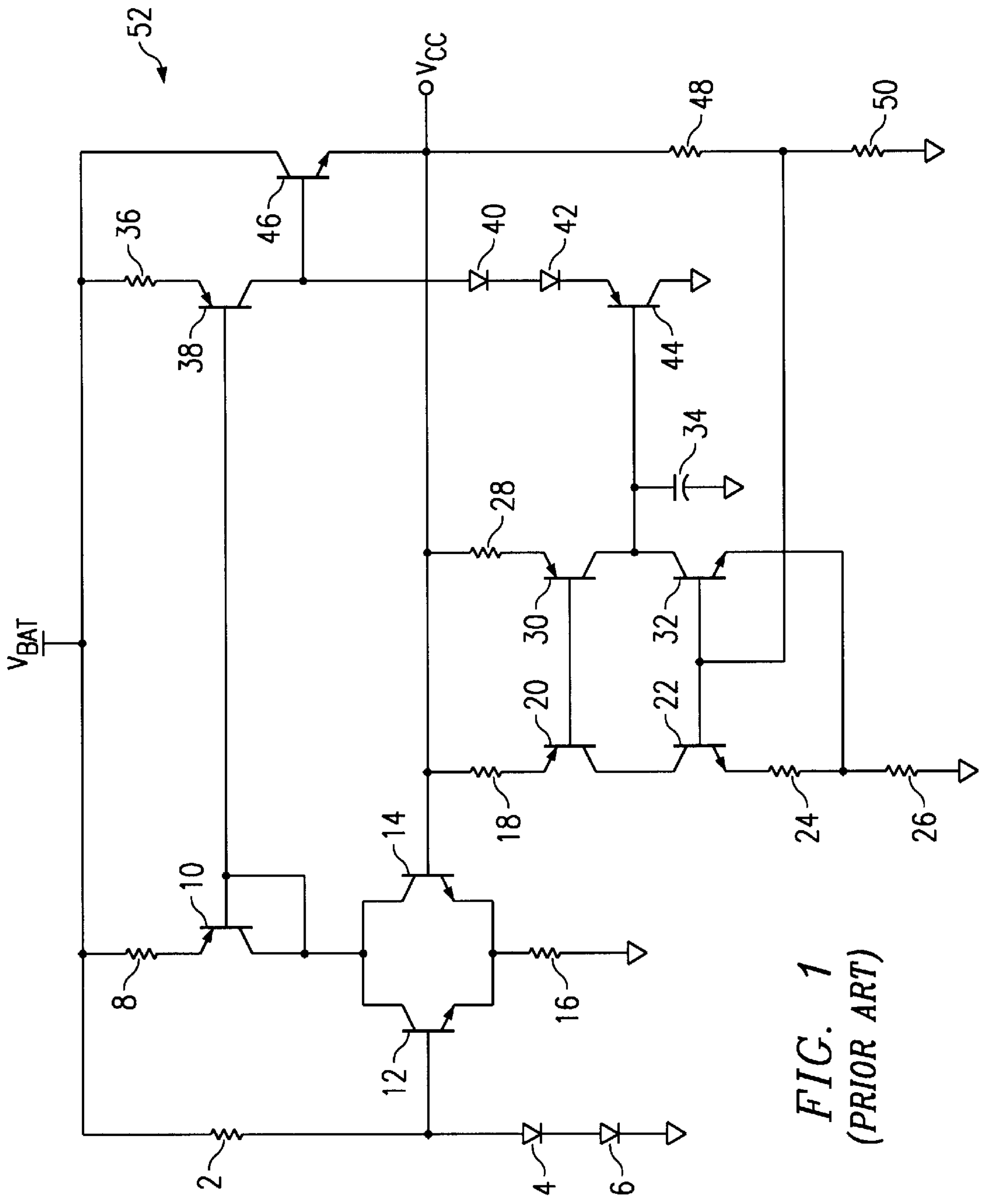
FIG. 1 (PRIOR ART)
FIG. 1 is an voltage regulation circuit, as known in the prior art.
Figure 2:
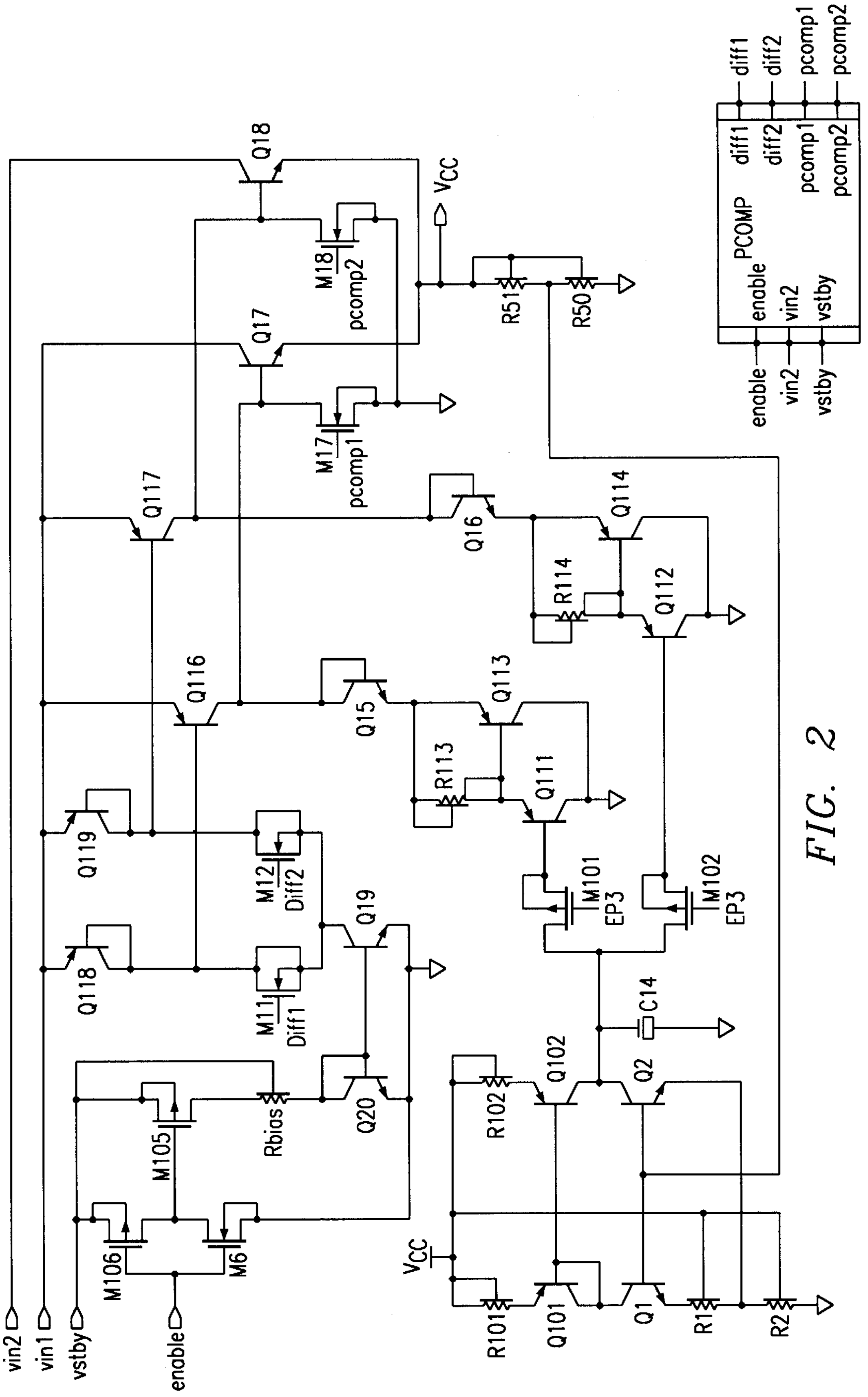
FIG. 2 is the preferred embodiment of a voltage regulation circuit.

Referring now to FIG. 2 the voltage regulator circuit can be described as a bias current circuit, a bandgap based regulator circuit, two voltage level shifting circuits, and two pass elements.

The bias circuit is constructed by connecting the source of P-channel transistor M106 and the source of P-channel transistor M105 to a standby voltage, which is a regulated voltage commonly used to maintain static memory in autombile electronics. The drain of M106 is connected to the drain of N-channel transistor M6 and the gate of M105. The gates of M106 and M6 are coupled to receive an enable signal. The drain of transistor M105 is connected to a first end of resistor Rbias, the second end of Rbias is connected to the collector and base of NPN transistor Q20. The source of transistor N-channel M6 and the emitter of transistor Q20 are connected to ground. The base of Q20 is connected to the base of Q19. The emitter of NPN transistor Q19 is connected to ground. PNP transistors Q118 and Q119 are configured as diodes. The emitters of Q118 and Q119 are connected to voltage VIN1. VIN1 represents an automobile battery voltage. The base and collector of Q118 are connected to the base of PNP transistor Q116 and the drain of N-channel transistor M11. The gate of transistor M11 is coupled to a signal Diff1. The base and collector of transistor Q119 is connected to the base of NPN transistor Q117 and the drain of N-channel transistor M12. The gate of transistor M12 is coupled to a signal Diff2. The source of M11 is connected to the source of M12 and to the collector of Q19.

The bandgap based regulator is constructed by connecting a first end of R101 to a Vcc voltage. The second end of R101 is connected to the emitter of PNP transistor Q101. The base and collector of Q101 is connected to the base of Q102 and to the collector of NPN transistor Q1. The base of Q1 is connected to the base of NPN transistor Q2. The emitter of transistor Q1 is connected to a first end of resistor R1. The second end of resistor R1 is connected to the emitter of Q2 and to the first end of R2. The second end of R2 is connected to ground. The emitter of transistor Q102 is connected to the second end of R102. The collector of Q102 is connected to the collector of Q2 and to a first end of capacitor C14, to the drains P-channel transistors M101 and M102. The second end of capacitor C14 is connected to ground.

The second voltage level shifting circuit is constructed by connecting the drain of M102 to the first end of capacitor C14. The gate of M102 is coupled to a signal EP3. The source of M102 is connected to the base of PNP transistor Q112. The emitter of Q112 is connected to the base of PNP transistor Q114 and to the second end of resistor R114. The collector of transistor Q112 is connected to the collector of transistor Q114 and to ground. The first end of resistor 114 is connected to the emitter of Q114 and the emitter of NPN transistor Q16. The collector and base of transistor Q16 are connected to the collector of Q117, the base of pass transistor Q18 and the drain of N-channel transistor M18. The emitter of Q117 is connected to the voltage VIN1. The gate of transistor M18 is coupled to a signal Pcomp2. The source of transistor M18 is connected to ground.

The second pass element is constructed by connecting the collector of NPN-transistor Q18 to the voltage VIN2. The emitter of Q18 forms the output of the voltage regulator circuit and is also connected to a first end of R51. The second end of R51 is connected to the first end of R50 and to the bases of Q1 and Q2. The second end of R50 is connected to ground.

In operation, this regulator circuit is a gained up bandgap circuit based on the Brokaw Cell that provides a nominal 5 volt supply which is used to drive the electronic circuitry in an automobile. The base coupled differential pair Q1 and Q2 and resistors R1 and R2 comprise the core of this bandgap based regulator. The current through Q1 and Q2 are set by R1 which also determines the gain of the bandgap circuit. The active load for the differential pair is provided by Q101 and Q102 with R101 and R102 included to increase the output impedance. The output of the bandgap circuit is taken at the collector of Q2. The loop stability is established with C14, a 10 pF compensation capacitor. When properly biased, a temperature independent voltage of approximately 1.27 volts is present at the base of Q1 and Q2. The bias current for the level shifting in the output stages is established by Rbias and Q19 and Q20. The current mirror formed by Q19 and Q20 is supplied with this standby voltage. A logic 1 on the enable pin turns on the current mirror. With voltage VIN2 less than 8 volts M11 is turned on and the base of Q116 drops to about 4.3 volts. This turns on the bias leg consisting of Q116, Q15, Q113, and Q111. Transistor M101 is on and the output of the bandgap circuit is buffered by Q111 and level shifted to about 5.7 volts at the base of Q17. The voltage at Vcc is nominally 5 volts.

In order to obtain 5 volt output based on the bandgap voltage of approximately 1.27 volts, the bandgap reference volts must be gained up by use of the resistor network, resistors R50 and R51. The bandgap voltage is applied to the first end of R50. R51 and R50 have a combined voltage drop of 5 volts when biased by the pass element Q17. By choosing different ratios of R51/R50 different output voltages can be obtained.

The bandgap circuit is bootstrapped in that its supply voltage is derived from the gained up bandgap voltage. By supplying the bandgap circuit in this manner, a high immunity to power supply ripple is achieved.

When the voltage VIN2 exceeds about 8 volts the output voltage bias current is now supplied by Q18. The comparator used to sense the voltage level of VIN2 and switch the pass transistors will be discussed later. Transistor M12 turns on and transistor M11 turns off providing the bias current for the bias leg comprised of Q117, Q16, Q114, and Q112. M102 turns on and applies the output of the bandgap circuit to the base of emitter follower Q112. This voltage is level shifted to about 5.7 volts just like discussed above at the base of Q18. Now Q18 biases the resistor network of R51 and R50.

Figure 3:
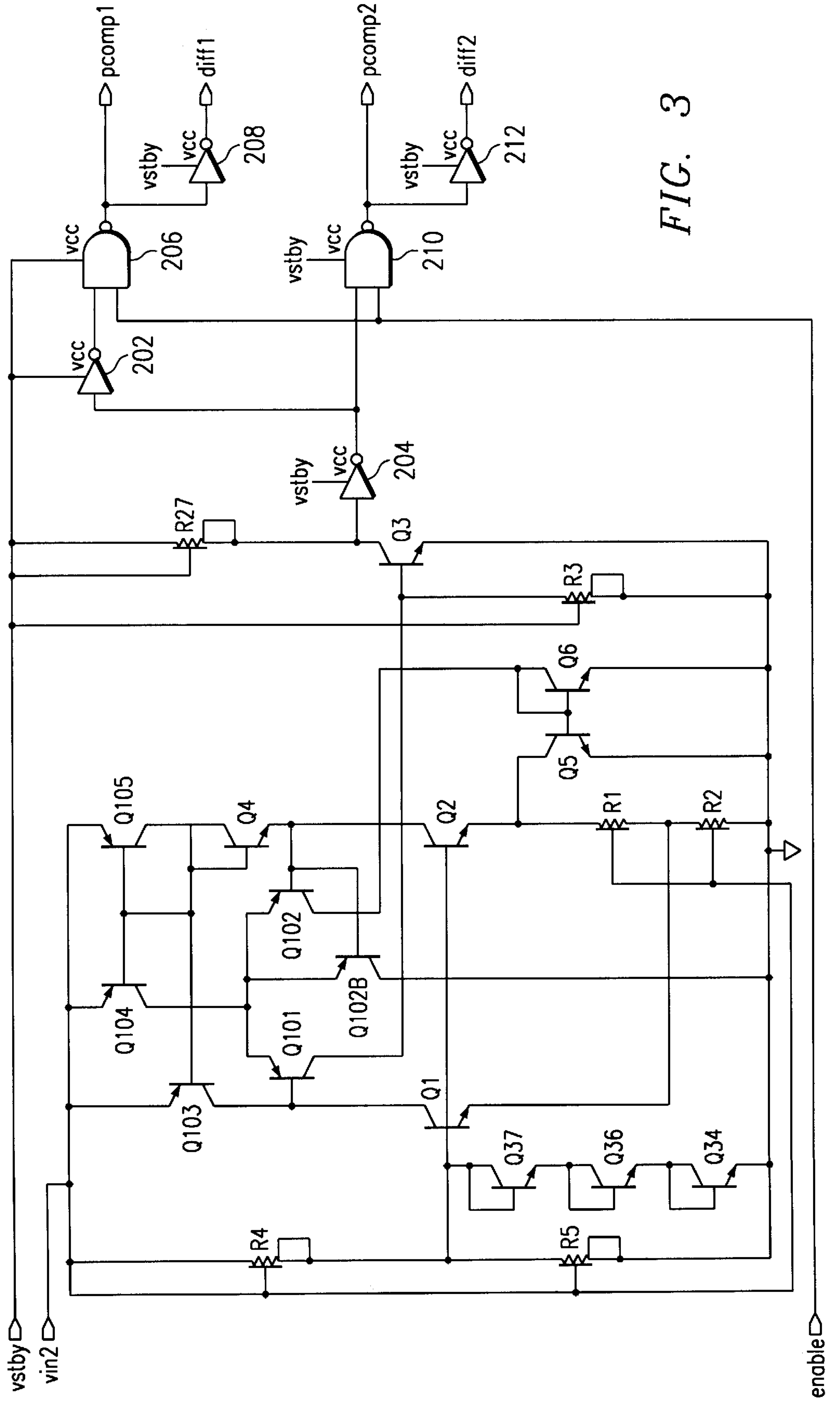
FIG. 3 is the preferred embodiment of the comparator used to control the preferred embodiment of the voltage regulator.

Referring now to FIG. 3, the preferred embodiment of the comparator used to control the preferred embodiment of the voltage regulator of FIG. 2 will now be described. The comparator is constructed by connecting a first end of resistor R4, the emitter of PNP transistor Q103, the emitter of PNP transistor 104 and 105 to a voltage VIN2 which is a voltage generated by a power supply somewhere on the automobile. The second end of resistor R4 is connected to the first end of R5, the base of NPN transistor Q1 and Q2. Transistors Q34, Q36, and Q37 are configured as diodes and connected in series across the bases of Q1 and Q2 and ground. The base of Q103 is connected to the bases of Q104, Q105 and Q4, and the collectors of transistor 105 and NPN transistor Q4. The collector of transistor Q103 is connected to the base of PNP transistor Q101 and the collector of transistor Q1. The collector of transistor Q104 is connected to the emitters of transistors Q101, Q102, and Q102B. The base of Q102 is connected to the base of transistor Q102B and to the emitter of transistor Q4 and the collector of transistor Q2. The emitter of transistor Q2 is connected to the first end of resistor Ri and the collector of NPN Q5. The second end of R1 is connected to the emitter of Q1 and the first end of R2. The second end of R2 is connected to ground. The base of transistor Q5 is connected to the base of NPN transistor Q6 and collector, and the collector of transistor Q102. The emitter of transistor Q6 is connected to ground. The collector of transistor Q101 is connected to the base of NPN transistor Q3 and the first end of resistor R3. The second end of resistor R3 is connected to ground. The first end of resistor R27 is connected to a standby voltage while the second end of R27 is connected to the collector of Q3 and the input of inverter 204. The output of inverter 204 is connected to the input of inverter 202 and an input of nand gate 210. The other input to nand gate 210 is coupled to an enable signal. The output of nand gate 210 comprises the signal Pcomp2 and is also connected to the input of inverter 212. The output of inverter 212 generates the signal Diff2. The output of inverter 202 is connected to an input of nand gate 206. The other input of nand gate 206 is connected to an enable signal. The output of nand gate 206 generates the signal Pcomp1 and is also connected to the input of inverter 208. The output of inverter 208 generates the signal Diff1.

In operation, this is a comparator based on the broken bandgap topology with the bandgap voltage as the built-in voltage reference. This comparator senses the voltage VIN2 and uses combinational logic to determine which transistor, that is which pass element Q17 or Q18, serves as the pass element for the voltage regulator circuit. The core of this comparator consists of components Q1, Q2, Q103, Q105, R1 and R2. The resistor divider R4 and R5 sense the voltage VIN2 and apply a fraction of this voltage to the common base of Q1 and Q2. The ratio of R5/R4 is chosen so that when VIN2 reaches approximately 8 volts the bandgap voltage is applied to the base of Q1 and Q2. The common base voltage is clamped to three diode potentials by using transistors Q34, Q36 and Q37.

When voltage VIN2 is less than the threshold voltage, Q2 conducts with little voltage drop across a negligible current flowing through Q1. There is a differential pair comprised of Q101 and split transistor Q102 and Q102B. When VIN2 is less than the threshold voltage and is increasing, the pair Q102 and Q102B conduct current and Q101 is off. When the trip point is reached the current in Q1 and Q2 are equal. The combination of Q5 and Q6 adds hysteresis to the circuit by diverting a portion of the current to ground. This requires that the base voltage of Q1 and Q2 actually exceed the bandgap voltage in order to equalize the currents. When the current in Q1 and Q2 are equal, Q101 turns on and supplies the base current to inverter Q3.

When the common base voltage is greater than the threshold voltage and decreasing, Q102 and Q102B are off and no current is drawn from the base of Q2. As the base voltage passes through the trip point, Q101 turns off and the collector of Q3 is pulled high through resistor R27.

The collector voltage of Q3 along with the logic state of the enable signal determine whether Q17 or Q18 will serve as the output transistor for the regulation circuit. If the enable signal is a logic 1 and the voltage at the collector of Q3 is high, then voltage VIN2 is less than 8 volts and the common base voltage is less than the threshold voltage. The output transistor of the regulation circuit is Q17 under these conditions. Switch M11 is enabled by the signal Diff1 having a logic 1 value. The signal Pcomp1 enables M101 and allows the collector voltage at Q2 to be level shifted and applied to the base of Q17. Signal Diff2 turns off M12, M102 is turned off by signal Pcomp2, and M18 ensures that pass element Q18 is off by pulling its base to ground potential.

If the collector voltage of Q3 is low as is the case when voltage VIN2 is greater than the threshold voltage, the output transistor of the regulation circuit is Q18. Signal Diff2 enables M12 and drives the base of Q117. Signal Pcomp2 enables M102 and allows the collector voltage at Q2 to be level shifted and applied to the base of Q18. Signal Diff1 turns off transistor M11, signal Pcomp2 turns off transistor M101, and transistor M17 ensures that pass element Q17 is off by pulling its base to ground potential.

If the voltage regulation circuit and the comparator circuit are disable by a low level signal on the enable pin there exists the possibility that leakage currents in Q116 at high temperature could cause the voltage level at Vcc to increase. This could cause other bias switches connected to Vcc to conduct currents inadvertently. To reduce the chance of this occurring, when the enable signal is low, signals Pcomp1, Pcomp2 turn on M17 and M18 respectively. Thus, any leakage currents into the base of the output devices is diverted to ground through these low resistance switches.

The table below is a summary of the states of the various output signals for the comparator as a function of the voltage VIN2 and the enable signal.

| | VIN2 < Vthreshold | | VIN2 > Vthreshold | |
|---|---|---|---|---|
| Enable | 0 | 1 | 0 | 1 |
| Diff1 | 0 | 1 | 0 | 0 |
| Diff2 | 0 | 0 | 0 | 1 |
| Pcomp1 | 1 | 0 | 1 | 1 |
| Pcomp2 | 1 | 1 | 1 | 0 |

By using the above described voltage regulator, a low voltage integration process can be used since the power supply voltage never reaches the load dump high voltages and therefore the second pass transistors never gets exposed to a high voltage condition. Also, the first transistor can withstand higher voltages such as in a load dump condition since its base is grounded. The disclosed invention is advantageous over the prior art voltage regulators since the regulation circuit claimed below can be made using low voltage integration process technology.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An apparatus comprising a voltage regulator circuit having:

a first circuit powered by a battery voltage and having an output and a means for enabling the first circuit, wherein the first circuit is capable of handling a load dump condition of the battery voltage;

a second circuit powered by a low voltage self-generated power supply voltage provided by the apparatus and having an output connected to the output of the first circuit and forming the output of the voltage regulator circuit and having a means for enabling the second circuit, wherein the low voltage self-generated power supply voltage protects the second circuit from a load dump condition of the battery voltage; and a comparator having an input connected to the self-generated power supply voltage and having an output coupled to the means for enabling the first circuit and having an inverted output coupled to the means for enabling the second circuit such that the first circuit is enabled and powered by the battery voltage and the second circuit is disabled when the apparatus is enabled until the self-generated power supply voltage reaches a predetermined voltage, and the first circuit is disabled and the second circuit is enabled and powered by the self-generated power supply voltage when the self-generated power supply voltage exceeds the predetermined voltage;

wherein the voltage regulator circuit is fabricated using a low voltage integration process technology.

2. The apparatus of claim 1 wherein the predetermined voltage is approximately 8 volts.

3. The apparatus of claim 1 wherein the first circuit comprises a first pass element, a first regulation circuit, and a first transistor and the second circuit comprises a second pass element, a second regulation circuit, and a second transistor.

4. A voltage regulator circuit comprising:

a bandgap based regulator circuit having an output;

a first voltage level shifting circuit having an input coupled to the output of the bandgap based regulation circuit, having a first enabling circuit to enable the first voltage level shifting circuit, and having an output;

a first pass element having a current path with a first end and a second end and having a control element, the first end of the current path coupled to a battery voltage, and the control element coupled to the output of the first voltage level shifting circuit, wherein the first pass element is capable of handling a load dump condition of the battery voltage;

a second voltage level shifting circuit having an input coupled to the output of the bandgap based regulation circuit, having a second enabling circuit to enable the second voltage level shifting circuit, and having an output;

a second pass element having a current path with the first end and a second end and having a control element, the first end of the current path coupled to a low voltage self-generated power supply voltage, the control element coupled to the output of the second voltage level shifting circuit, and the second end of the current path connected to the second end of the current path of the first pass element and forming the output of the voltage regulator circuit, wherein the low voltage self-generated power supply voltage protects the second pass element from a load dump condition of the battery voltage; and a comparator circuit having an input coupled to the self-generated power supply voltage, having an internal reference voltage, having an output coupled to the first enabling circuit, and having an inverted output coupled to the second enabling circuit, wherein the self-generated power supply voltage is compared to the internal reference voltage such that the first pass element is turned on and powered by the battery voltage and the second pass element is turned off when the voltage regulator is enabled until the self-generated power supply voltage reaches a predetermined voltage, and the first pass element is turned off and the second pass element is turned on and powered by the self-generated power supply voltage when the self-generated power supply voltage exceeds the predetermined voltage wherein the voltage regulator circuit is fabricated using a low voltage integration process technology.

5. The voltage regulator circuit of claim 4 wherein the predetermined voltage in the comparator is approximately 8 volts.

6. The voltage regulator of claim 4 wherein the reference voltage in the comparator is generated using a broken bandgap circuit.

7. The voltage regulator circuit of claim 4 wherein the first and second pass elements comprise bipolar transistors.

8. The voltage regulator of claim 7 wherein the first and second pass elements comprise NPN bipolar transistors.

9. An automobile having onboard electronics powered by a voltage regulator circuit comprising:

a bandgap based regulator circuit having an output;

a first voltage level shifting circuit having an input coupled to the output of the bandgap based regulation circuit, having a first enabling circuit to enable the first voltage level shifting circuit, and having an output;

a first pass element having a current path with a first end and a second end and having a control element, the first end of the current path coupled to a battery voltage, and the control element coupled to the output of the first voltage level shifting circuit, wherein the first pass element is capable of handling a load dump condition of the battery voltage;

a second voltage level shifting circuit having an input coupled to the output of the bandgap based regulation circuit, having a second enabling circuit to enable the second voltage level shifting circuit, and having an output;

a second pass element having a current path with the first end and a second end and having a control element, the first end of the current path coupled to a low voltage self-generated power supply voltage, the control element coupled to the output of the second voltage level shifting circuit, and the second end of the current path connected to the second end of the current path of the first pass element and forming the output of the voltage regulator circuit, wherein the low voltage self-generated power supply voltage protects the second pass element from a load dump condition of the battery voltage; and a comparator circuit having an input coupled to the self-generated power supply voltage, having an internal reference voltage, having an output coupled to the first enabling circuit, and having an inverted output coupled to the second enabling circuit, wherein the self-generated power supply voltage is compared to the internal reference voltage such that the first pass element is turned on and powered by the battery voltage and the second pass element is turned off when the voltage regulator is enabled until the self-generated power supply voltage reaches a predetermined voltage, and the first pass element is turned off and the second pass element is turned on and powered by the self-generated power supply voltage when the self-generated power supply voltage exceeds the predetermined voltage wherein the voltage regulator circuit is fabricated using a low voltage integration process technology.

10. The automobile of claim 9 wherein the predetermined voltage in the comparator is approximately 8 volts.

11. The automobile of claim 9 wherein the predetermined voltage is generated with a broken bandgap voltage circuit.

12. The automobile of claim 9 wherein the first and second pass elements comprises bipolar transistors.

13. The automobile of claim 12 wherein first and second bipolar transistors comprise NPN transistors.

14. A method for regulating a voltage in an automobile comprising the steps of:

enabling the automobile;

powering a voltage regulator circuit with a battery;

comparing a low voltage self-generated power supply voltage to a reference voltage, for determining when the self-generated power supply voltage exceeds a predetermined voltage;

continuing to power the voltage regulator circuit with the battery until the self-generated power supply voltage exceeds the predetermined voltage; and powering the voltage regulator circuit with the self-generated power supply voltage when the self-generated power supply voltage exceeds the predetermined voltage, wherein the low voltage self-generated power supply voltage protects the voltage regulator circuit from a load dump condition of the battery voltage and wherein the voltage regulator circuit is fabricated using a low voltage integration process technology.

15. The method of claim 14 wherein the predetermined voltage is approximately 8 volts.

16. The apparatus of claim 1, wherein the apparatus consists of the voltage regulator circuit.

17. The apparatus of claim 1, wherein the apparatus comprises an automobile.

18. The method of claim 14, wherein the step of comparing the power supply voltage to the reference voltage, for determining when the power supply voltage exceeds the predetermined voltage is performed continuously.

19. An apparatus comprising a voltage regulator circuit having:

a first circuit powered by a battery voltage and having an output and a first enabling circuit for enabling the first circuit, wherein the first circuit is capable of handling a load dump condition of the battery voltage;

a second circuit powered by a low voltage self-generated regulator voltage and having an output connected to the output of the first circuit and forming the output of the voltage regulator circuit and having a second enabling circuit for enabling the second circuit, wherein the low voltage self-generated power supply voltage protects the second circuit from a load dump condition of the battery voltage; and a comparator having an input connected to the power supply voltage and having an output coupled to the first enabling circuit and having an inverted output coupled to the second enabling circuit such that the first circuit is enabled and powered by the battery voltage and the second circuit is disabled until the self-generated regulator voltage reaches a predetermined voltage, and the first circuit is disabled and the second circuit is enabled and powered by the self-generated power supply voltage when the self-generated regulator voltage is above the predetermined voltage, wherein the voltage regulator circuit is fabricated using a low voltage integration process technology.

20. The apparatus of claim 19 wherein the predetermined voltage is approximately 8 volts.

21. The apparatus of claim 19 wherein the first circuit comprises a first pass element, a first regulation circuit, and a first transistor and the second circuit comprises a second pass element, a second regulation circuit, and a second transistor.

* * * * *